United States Patent
Bestaoui-Spurr et al.

(10) Patent No.: US 10,087,365 B2
(45) Date of Patent: Oct. 2, 2018

(54) PROPPANTS WITH IMPROVED STRENGTH

(71) Applicant: BAKER HUGHES INCORPORATED, Houston, TX (US)

(72) Inventors: Naima Bestaoui-Spurr, The Woodlands, TX (US); Qi Qu, Spring, TX (US); Christopher J. Stephenson, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 15/360,696

(22) Filed: Nov. 23, 2016

(65) Prior Publication Data

US 2017/0073576 A1    Mar. 16, 2017

Related U.S. Application Data

(63) Continuation-in-part of application No. 14/066,893, filed on Oct. 30, 2013, now abandoned.

(51) Int. Cl.
  *B05D 3/02* (2006.01)
  *C09K 8/80* (2006.01)
  *C09K 8/62* (2006.01)

(52) U.S. Cl.
  CPC ............ *C09K 8/805* (2013.01); *B05D 3/0218* (2013.01); *B05D 3/0254* (2013.01); *C09K 8/62* (2013.01); *C09K 2208/08* (2013.01); *C09K 2208/10* (2013.01)

(58) Field of Classification Search
  CPC .............. B05D 3/0218; B05D 3/0254; C09K 2208/08; C09K 2208/10; C09K 8/62; C09K 8/805
  USPC .................................................. 427/212, 215
  See application file for complete search history.

(56) References Cited

U.S. PATENT DOCUMENTS

| | | | |
|---|---|---|---|
| 4,154,894 A | 5/1979 | Bushey | |
| 4,432,798 A | 2/1984 | Helferich et al. | |
| 4,469,517 A | 9/1984 | Cooke, Jr. | |
| 4,585,064 A | 4/1986 | Graham et al. | |
| 4,713,203 A | 12/1987 | Andrews | |
| 5,342,595 A | 8/1994 | Davidovits et al. | |
| 6,059,034 A | 5/2000 | Rickards et al. | |

(Continued)

FOREIGN PATENT DOCUMENTS

| CA | 2 447 928 A1 | 5/2005 |
|---|---|---|
| CA | 2 540 415 A1 | 5/2005 |

(Continued)

OTHER PUBLICATIONS

Abdullah MMA et al., "Mechanism and Chemical Reaction of Fly Ash Geopolymer Cement—A Review," Int. J. Pure Appl. Sci. Technol., 6(1), pp. 35-44 (2011).

(Continued)

*Primary Examiner* — Alexander M Weddle
(74) *Attorney, Agent, or Firm* — Mossman, Kumar & Tyler, P.C.

(57) ABSTRACT

Cements, such as alkali activated binder, may be used as coatings on proppants, such as sand, to improve the strength thereof. The resulting chemically bonded phosphate ceramic (CBPC) coated proppants show increased compressive strength between about 60 to about 130 MPa, as well as produced fines of lower than about 10 wt % at 10,000 psi closure stress.

19 Claims, 1 Drawing Sheet

(56) References Cited

U.S. PATENT DOCUMENTS

| | | |
|---|---|---|
| 6,330,916 B1 | 12/2001 | Rickards et al. |
| 6,364,018 B1 | 4/2002 | Brannon et al. |
| 6,742,590 B1 | 6/2004 | Nguyen |
| 7,160,844 B2 | 1/2007 | Urbanek |
| 7,931,087 B2 | 4/2011 | Gupta |
| 2003/0102128 A1 | 6/2003 | Dawson et al. |
| 2005/0244641 A1 | 11/2005 | Vincent |
| 2007/0023187 A1 | 2/2007 | Canova et al. |
| 2007/0131145 A1 | 6/2007 | Biscan et al. |
| 2009/0100766 A1 | 4/2009 | Gebhardt |
| 2010/0104873 A1 | 4/2010 | Wang et al. |
| 2010/0113251 A1 | 5/2010 | San-Miguel et al. |
| 2010/0203336 A1* | 8/2010 | Shiao ............ C04B 18/021 428/404 |
| 2011/0118155 A1 | 5/2011 | Pisklak et al. |
| 2011/0159240 A1 | 6/2011 | Shiao et al. |
| 2011/0160101 A1 | 6/2011 | Naderhoff et al. |
| 2011/0297383 A1 | 12/2011 | Tanguay et al. |
| 2012/0024026 A1* | 2/2012 | Varadachari ............ C05B 13/00 71/43 |
| 2012/0152153 A1 | 6/2012 | Gong et al. |
| 2012/0156381 A1 | 6/2012 | Allouche et al. |
| 2012/0157358 A1 | 6/2012 | Fang et al. |
| 2013/0081812 A1 | 4/2013 | Green et al. |
| 2013/0274153 A1 | 10/2013 | Urbanek |
| 2014/0162911 A1 | 6/2014 | Monastiriotis et al. |
| 2015/0114640 A1* | 4/2015 | Bestaoui-Spurr ...... C09K 8/805 166/280.2 |

FOREIGN PATENT DOCUMENTS

| | | |
|---|---|---|
| CA | 2 540 429 A1 | 5/2005 |
| CA | 2 475 668 A1 | 1/2006 |
| CA | 2 494 051 A1 | 7/2006 |
| EP | 0 595 471 B1 | 6/1996 |
| WO | 2010-041025 A1 | 4/2010 |
| WO | 2012055028 A1 | 5/2012 |

OTHER PUBLICATIONS

Int'l Search Report & Written Opinion in PCT/US2014/060671, dated Jan. 28, 2015.

EP Search Report in EP 14859137.3, dated May 4, 2017 (8 pp.).

* cited by examiner

PROPPANTS WITH IMPROVED STRENGTH

CROSS-REFERENCE TO RELATED APPLICATION

This application is a continuation-in-part of U.S. Ser. No. 14/066,893 filed Oct. 30, 2013, incorporated herein by reference in its entirety.

TECHNICAL FIELD

The present invention relates to proppants used in hydraulic fracturing treatments for subterranean formations, and more particularly relates to methods for making proppants and proppants made thereby where the proppants have a coating that imparts improved strength.

TECHNICAL BACKGROUND

Hydraulic fracturing is a common stimulation technique used to enhance production of hydrocarbon fluids from subterranean formations. In a typical hydraulic fracturing treatment, fracturing treatment fluid containing a solid proppant material is injected into the formation at a pressure sufficiently high enough to cause the formation to fracture or cause enlargement of natural fractures in the reservoir. The fracturing fluid that contains the proppant or propping agent typically has its viscosity increased by a gelling agent such as a polymer, which may be uncrosslinked or crosslinked, and/or a viscoelastic surfactant. During a typical fracturing treatment, propping agents or proppant materials are deposited in a fracture, where they remain after the treatment is completed. After deposition, the proppant materials serve to hold the fracture open, thereby enhancing the ability of fluids to migrate from the formation to the well bore through the fracture. Because fractured well productivity depends on the ability of a fracture to conduct fluids from a formation to a wellbore, fracture conductivity is an important parameter in determining the degree of success of a hydraulic fracturing treatment and the choice of proppant may be critical to the success of stimulation.

One problem related to hydraulic fracturing treatments is the creation of reservoir "fines" and associated reduction in fracture conductivity. These fines may be produced when proppant materials are subjected to reservoir closure stresses within a formation fracture which cause proppant materials to be compressed together in such a way that small particles ("fines") are generated from the proppant material and/or reservoir matrix. In some cases, production of fines may be exacerbated during production/workover operations when a well is shut-in and then opened up. This phenomenon is known as "stress cycling" and is believed to result from increased differential pressure and closure stress that occurs during fluid production following a shut-in period. Production of fines is undesirable because of particulate production problems, and because of reduction in reservoir permeability due to plugging of pore throats in the reservoir matrix.

Production of particulate solids with subterranean formation fluids is also a common problem. The source of these particulate solids may be unconsolidated material from the formation, proppant from a fracturing treatment and/or fines generated from crushed fracture proppant, as mentioned above. Production of solid proppant material is commonly known as "proppant flowback." In addition to causing increased wear on downhole and surface production equipment, the presence of particulate materials in production fluids may also lead to significant expense and production downtime associated with removing these materials from wellbores and/or production equipment. Accumulation of these materials in a well bore may also restrict or even prevent fluid production. In addition, loss of proppant due to proppant flowback may also reduce conductivity of a fracture pack.

It will be appreciated that if proppant strength can be improved that at least two problems are addressed. First, proppants with improved strength can better hold the fracture open to facilitate the production of hydrocarbon fluids. Second, stronger proppants do not disintegrate and exacerbate the production of fines. Thus, it would be very desirable to discover methods to produce stronger proppants.

SUMMARY

In one non-limiting embodiment there may be provided a method of preparing a strengthened proppant that includes mixing together (a) a compound selected from the group consisting of an alkali metal phosphate, phosphoric acid, ammonium phosphate, ammonium di-hydrogen phosphate and combinations thereof, and (b) a binder in water to form an aqueous solution. The (b) binder is selected from the group consisting of an alkaline earth metal hydroxide, an alkaline earth metal oxide, a metal oxide, a metal hydroxide, an aluminosilicate, and combinations thereof. The method additionally includes at least partially coating a plurality of proppant cores with the aqueous solution, and then exposing the aqueous solution-coated proppant cores to a temperature to polymerize the (a) compound and (b) binder to form a coating where the coating includes, but is not necessarily restricted to, magnesium phosphate, calcium phosphate, aluminum phosphate, zirconium aluminum phosphate, zirconium phosphate, zirconium phosphonate, magnesium potassium phosphate, potassium aluminum phosphate, alkali metal transition metal phosphates, carbide materials, tungsten carbide, cements, polymer cements, polyamide-imides, polyether ether ketones (PEEK), and combinations thereof, to give the strengthened proppant. There are also provided the strengthened proppants produced by this method.

BRIEF DESCRIPTION OF THE DRAWINGS

The following descriptions should not be considered limiting in any way.

Figure 1:
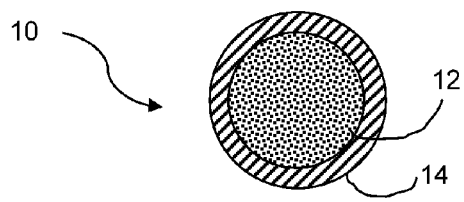
FIG. 1 is a schematic cross-section illustration of a coated proppant as described herein.

It will be appreciated that FIG. 1 is a schematic illustration, and that it is not necessarily to scale, and that certain proportions and features may be exaggerated for clarity. For instance, the proppant shown in FIG. 1 is illustrated to be perfectly spherical, whereas actual proppants are typically only approximately spherical.

DETAILED DESCRIPTION

It has been discovered that phosphate ceramics binders and other materials may be used as coatings in order to improve the strength of proppants, including, but not necessarily limited to, brown and white sand. The resulting coated proppant material show a dramatic improvement in the strength of both the white and brown sand. In both cases, the fines flowback obtained at a 10,000 psi (69 MPa) closure stress using the API standards are lower than about 10 wt %.

More specifically, a method and composition is described to coat proppant sand to dramatically increase its strength thereby extending its usage to formation closing stresses to at least about 5000 (34 MPa), alternatively at least to about 10,000 (69 MPa) and in another non-limiting embodiment to about 12,000 psi (83 MPa), and even up to 130 MPa (18,900 psi). In one non-limiting embodiment, the compressive strength ranges from about 35 independently to about 130 MPa, alternatively from about 50 independently to about 100 MPa, and in another non-restrictive embodiment from about 60 independently to about 83 MPa. By "withstanding" closure stresses in this range is meant that the coated proppant will not be crushed or disintegrated at these closure stresses and that, if generated, the amount of fines will be less than 10 wt. % of the total amount of proppant. The term "independently" as used herein with respect to a parameter range means that any lower threshold may be combined with any upper threshold to provide a suitable, acceptable alternative range.

The coated proppant is slightly lighter (less dense) than sand and its apparent density is expected to range between about 2.3 independently to about 2.63 g/cm$^3$, alternatively from between about 2.55 independently to about 2.6 g/cm$^3$; in another non-restrictive version from about 2 to about 2.61 g/cm$^3$. In another non-limiting embodiment, the density of the chemically bonded phosphate ceramics (CBPCs) and other materials themselves described herein ranges from about 1.8 to 2.5 g/cm$^3$.

Inorganic polymers are used as coating materials by mixing a compound selected from the group consisting of an alkali metal phosphate, a phosphoric acid, ammonium phosphate and combinations thereof and a binder solution made of an alkaline earth metal hydroxide, an alkaline earth metal oxide, a metal oxide, a metal hydroxide, an aluminosilicate, and combinations thereof, in water which results in a very strong, rigid network. The resulting coatings have an amorphous, structure. The reaction is exothermic forming a solid polymer at room temperature or mild heat causing the molecules to poly-condense or polymerize. In one non-limiting embodiment, "room temperature" is defined as the temperature of the room where the reaction is conducted. The physical properties of the resultant rigid chain or net of are largely determined by the ratio of the compounds and the binders. By varying this ratio, the material may be made rigid, suitable for use as a concrete, cement, or waste encapsulating medium, or more flexible for use as an adhesive, sealant or as an impregnating resin. The coating process is similar to that of resin coated sand and is accomplished by coating heated sand in a mixer, such as a rotary mixer, with the solution including the compound and the binder when exposing the sample to a heat gun or other heat source for less than about ten minutes to trigger polymerization. The resulting proppant may or not then be put in an oven for about three hours to finish the polymerization process, if necessary.

In one non-limiting embodiment, the proppants, sometimes called proppant cores, may include, but not necessarily be limited to, white sand, brown sand, ceramic beads, glass beads, bauxite grains, sintered bauxite, sized calcium carbonate, walnut shell fragments, aluminum pellets, silica, nylon pellets, nuts shells, gravel, resinous particles, alumina, minerals, polymeric particles, and combinations thereof.

Examples of ceramics include, but are not necessarily limited to, oxide-based ceramics, nitride-based ceramics, carbide-based ceramics, boride-based ceramics, silicide-based ceramics, or a combination thereof. In a non-limiting embodiment, the oxide-based ceramic may include, but is not necessarily limited to, silica ($SiO_2$), titania ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic may contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include, but are not necessarily limited to, zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Examples of suitable sands for the proppant core include, but are not limited to, Arizona sand, Wisconsin sand, Badger sand, Brady sand, and Ottawa sand. In a non-limiting embodiment, the solid particulate may be made of a mineral such as bauxite which is sintered to obtain a hard material. In another non-restrictive embodiment, the bauxite or sintered bauxite has a relatively high permeability such as the bauxite material disclosed in U.S. Pat. No. 4,713,203, the content of which is incorporated by reference herein in its entirety.

In another non-limiting embodiment, the proppant core may be a relatively lightweight or substantially neutrally buoyant particulate material or a mixture thereof. Such materials may be chipped, ground, crushed, or otherwise processed. By "relatively lightweight" it is meant that the solid particulate has an apparent specific gravity (ASG) which is less than or equal to 2.45, including those ultra lightweight materials having an ASG less than or equal to 2.25, alternatively less than or equal to 2.0, in a different non-limiting embodiment less than or equal to 1.75, and in another non-restrictive version less than or equal to 1.25 and often less than or equal to 1.05.

Naturally occurring solid particulates include, but are not necessarily limited to, nut shells such as walnut, coconut, pecan, almond, ivory nut, brazil nut, and the like; seed shells of fruits such as plum, olive, peach, cherry, apricot, and the like; seed shells of other plants such as maize (e.g., corn cobs or corn kernels); wood materials such as those derived from oak, hickory, walnut, poplar, mahogany, and the like. Such materials are particles may be formed by crushing, grinding, cutting, chipping, and the like.

Suitable relatively lightweight solid particulates are those disclosed in U.S. Pat. Nos. 6,364,018, 6,330,916 and 6,059,034, all of which are herein incorporated by reference in their entirety.

Other solid particulates for use herein include beads or pellets of nylon, polystyrene, polystyrene divinyl benzene or polyethylene terephthalate such as those set forth in U.S. Pat. No. 7,931,087, also incorporated herein by reference in its entirety.

Fracture proppant sizes may be any size suitable for use in a fracturing treatment of a subterranean formation. It is believed that the optimal size of particulate material relative to fracture proppant material may depend, among other things, on in situ closure stress. For example, a fracture proppant material may be desirable to withstand a closure stress of at least about 1000 psi (6.9 MPa), alternatively of at least about 5000 psi (34 MPa) or greater, up to 10,000 psi (69 MPa), even without the coating. However, with the coatings described herein, compression strength may range up to about 12,000 psi (83 MPa), and even up to 130 MPa (18,900 psi). In one non-limiting embodiment, the compressive strength ranges from about 35 independently to about 130 MPa, alternatively from about 50 independently to about 100 MPa, and in another non-restrictive embodiment from about 60 independently to about 83 MPa. However, it will be understood with benefit of this disclosure that these are just optional guidelines.

In one embodiment, the proppants used in the disclosed method may have a beaded shape or spherical shape and a size of from about 4 mesh independently to about 300 mesh, alternatively from about 8 mesh independently to about 140 mesh, alternatively from about 12 mesh independently to about 60 mesh, alternatively from about 16 mesh independently to about 40 mesh, and alternatively about 20/40 mesh. Thus, in one embodiment, the proppants may range in size from about 1 or 2 mm independently to about 0.1 mm; alternatively their size will be from about 0.2 mm independently to about 0.8 mm, alternatively from about 0.4 mm independently to about 0.6 mm, and alternatively about 0.6 mm. However, sizes greater than about 2 mm and less than about 0.1 mm are possible as well.

Suitable shapes for proppants include, but are not necessarily limited to, beaded, cubic, bar-shaped, cylindrical, rod-shaped or a mixture thereof. Shapes of the proppants may vary, but in one embodiment may be utilized in shapes having maximum length-based aspect ratio values, in one exemplary embodiment having a maximum length-based aspect ratio of less than or equal to about 25, alternatively of less than or equal to about 20, alternatively of less than or equal to about 7, and further alternatively of less than or equal to about 5. In yet another exemplary embodiment, shapes of such proppants may have maximum length-based aspect ratio values of from about 1 independently to about 25, alternatively from about 1 independently to about 20, alternatively from about 1 independently to about 7, and further alternatively from about 1 independently to about 5. In yet another exemplary embodiment, such proppants may be utilized in which the average maximum length-based aspect ratio of particles present in a sample or mixture containing only such particles ranges from about 1 independently to about 25, alternatively from about 1 independently to about 20, alternatively from about 2 independently to about 15, alternatively from about 2 independently to about 9, alternatively from about 4 independently to about 8, alternatively from about 5 independently to about 7, and further alternatively is about 7.

The coating material may include, but not necessarily be limited to, magnesium phosphate, calcium phosphate, aluminum phosphate, zirconium aluminum phosphate, zirconium phosphate, zirconium phosphonate, magnesium potassium phosphate, potassium aluminum phosphate, alkali metal transition metal phosphate, carbide materials such as tungsten carbide, cements, polymer cements, high performance polymer coatings such as polyamide-imide and polyether ether ketones (PEEK), and combinations thereof. "High performance polymers" means that they have high temperature tolerance (more than 150° C.) and are chemically resistant. By "tolerance" is meant that the deformable particulate materials maintain their structural integrity, that is, they do not break down into smaller fragments up to at least this temperature, or when they contact chemicals up to at least this temperature. As noted, the polymers are made by the reaction or an alkaline phosphate solution, including, but not limited to $KH_2PO_4$ and a binder source through a sol-gel exothermic reaction.

An acidic solution and sparsely soluble oxide are required to cause the reaction. The acidic solution can be acidic because of the presence of an alkali metal phosphate, phosphoric acid or ammonium phosphate, ammonium dihydrogen phosphate or the like. The sparsely soluble oxide can be any alkaline earth metal oxide, alkaline earth metal hydroxide, a metal hydroxide, a metal oxide or an aluminosilicate and the like. Sparsely soluble means that the oxide has low solubility in water or solubilizes very slowly in water. The reaction occurs between the acidic solution and the solubilized binder until the majority of the components (acidic solution and binder) are spent and transformed to the chemically bonded phosphate ceramics. In some instances the binder is not completely solubilize and some of the particles that did not solubilize become encapsulated in the phosphate ceramics acting as a reinforcing agent increasing the strength of the material. These inorganic polymers are considered "green" or environmentally advantageous, because they are synthesized from natural resources and their chemistry does not adversely affect the environment.

With respect to the metal suitable for use in the metal oxides and metal hydroxides, this metal includes, but is not necessarily limited to, aluminum, silicon, zirconium, titanium, niobium, magnesium, manganese, calcium, and combinations thereof.

In the specific, non-limiting case of forming a chemically bonded phosphate ceramic (CBPC), the mole ratio between the acidic solution, also sometimes termed "the compound" herein, and the binder ranges from about 0.1:1 independently to about 30:1; alternatively from about 1:1 independently to about 6:1. In one non-limiting embodiment, polymers such as, but not necessarily limited to, CMC (carboxymethyl cellulose), guar, guar derivatives, and the like may be included to improve the flexibility of the coating. In one non-limiting embodiment, these materials may be useful for flow back control, particularly in the embodiment where the coating may be deformable—this may help the proppant stay in place. These materials may be used together with non-coated proppants. It is expected that flowing fluid back through the coated proppants where the amount of the proppants flowed back is less than the amount of otherwise identical proppants flowed back, where the otherwise identical proppants have an absence of the coating described herein. In one non-limiting version, the amount of proppants flowed back is reduced from about 10 wt % or more less proppant produced to 100 wt %; alternatively, the amount of proppants flowed back is reduced from about 20 wt % or more less proppant produced to 80 wt %.

Chemically bonded phosphate ceramics are generated by an acid/base reaction of an acidified phosphate or phosphoric acid and a sparsely soluble metal oxide. They optionally contain fillers that actively participate with the components of the reaction. Such fillers include, but are not necessarily limited to, fly ash and wollastonite and the like. The ratio of filler to reaction components (acidic solution and binder) can vary between about 1 independently to about 80 wt % of the total mass of solid material used in the reaction; alternatively between about 5 independently to about 70 wt %.

A suitable temperature range to initiate the polymerization of the coating may range from about 0° C. independently to about 300° C.; in another non-restrictive embodiment from about 20° C. independently to about 300° C.; alternatively from about 60° C. independently to about 200° C. Alternatively, 20° C. may be defined for all purposes herein as "room temperature", which may also be understood to range from about 5° independently to about 50° C.; alternatively from about 19° C. independently to about 26° C.

Optionally boric acid and/or borax may be used as a retarder to slow down the reaction.

A suitable temperature range to further complete or cure the polymerization of the coating may range from about 20° C. independently to about 300° C.; alternatively from about 25° C. independently to about 200° C.

The amount of the coating, using the proppant (or proppant core) as a basis, ranges from about 2 wt % independently to about 30 wt % or higher; alternatively from about 5 wt % independently to about 15 wt %. Suitable amounts include, but are not necessarily limited to, about 2 wt %, about 4 wt %, about 5 wt %, about 8 wt %, and about 15 wt %, any of which may serve as a suitable lower or upper threshold of a proportion range.

It is expected that the coatings described herein may be applied to ultra-light weight proppants (ULWP) in order to improve their strength while maintaining low apparent density. The coating will also increase the temperature tolerance of the polymer beads.

The particular chemically bonded phosphate ceramics (CBPCs) have a variety of features, some of which have already been mentioned.

The CBPCs reach their final mechanical properties by chemical reaction at low temperature (<300° C.).
Density ranges from about 1.8 to about 2.5 g/cm³.
Compressive strength ranges from 60 to 130 MPa.
Bonding type of the CBPCs includes a mixture of ionic, covalent and Van Der Waals bonding, with the ionic and covalent dominating.
Both density and compressive strength can be controlled with additives and processing.
The CBPCs are thermally stable, which means that they do not decompose or come apart at high temperatures, even up to at least 800° C. In one non-limiting embodiment the high temperature range may be from about 40° F. to about 600° F. (about 4° C. to about 316° C.).

FIG. 1 illustrates a schematic, cross-sectional diagram of a coated proppant 10 as described herein, where the proppant core 12 is at least partially coated by a coating 14. It will be appreciated that "a coating at least partially covering the proppant cores" may be defined as the majority (over 50 wt %) of the proppants have at least some coating thereon even if 100 wt % of the proppants are not completely covered. Alternatively, "a coating at least partially covering the proppant cores" may be defined as at least the majority (over 50 wt %) of the proppants are completely covered with the coating. In another non-limiting embodiment, both of these definitions may be used simultaneously.

Stated another way, the thickness of the coating may range from about 2 independently to about 120 microns, alternatively from about 50 independently to about 80 microns, over a relatively wide range, in another non-limiting embodiment.

Additives, such as fillers, plasticizers, cure accelerators and retarders, and rheology modifiers may be used in the coating compositions described herein in order to achieve desired economical, physical, and chemical properties of the proppant coating during the mixing of the chemical components, forming and cure of the particles, and the field performance of the coatings on the proppants.

Compatible fillers include, but are not necessarily limited to, waste materials such as silica sand, Kevlar fibers, fly ash, sludges, slags, waste paper, rice husks, saw dust, and the like, volcanic aggregates, such as expanded perlite, pumice, scoria, obsidian, and the like, minerals, such as diatomaceous earth, mica, borosilicates, clays, metal oxides, metal fluorides, and the like, plant and animal remains, such as sea shells, coral, hemp fibers, and the like, manufactured fillers, such as silica, mineral fibers and mats, chopped or woven fiberglass, metal wools, turnings, shavings, wollastonite, nanoclays, carbon nanotubes, carbon fibers and nanofibers, graphene oxide, or graphite. In some non-limiting instances these fillers maybe part of the reaction.

In another non-limiting embodiment, a suitable CBPC is magnesium potassium phosphate hydrate (MKP), which may be synthesized according to the following reaction:

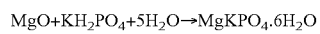

$$MgO + KH_2PO_4 + 5H_2O \rightarrow MgKPO_4 \cdot 6H_2O$$

This is an exothermic reaction. The resulting MKP is a hard, very durable solid phase with very low aqueous solubility. It is a highly crystalline material and has a density of 1.84 g/cm³, and is thermally stable.

Figure 2:
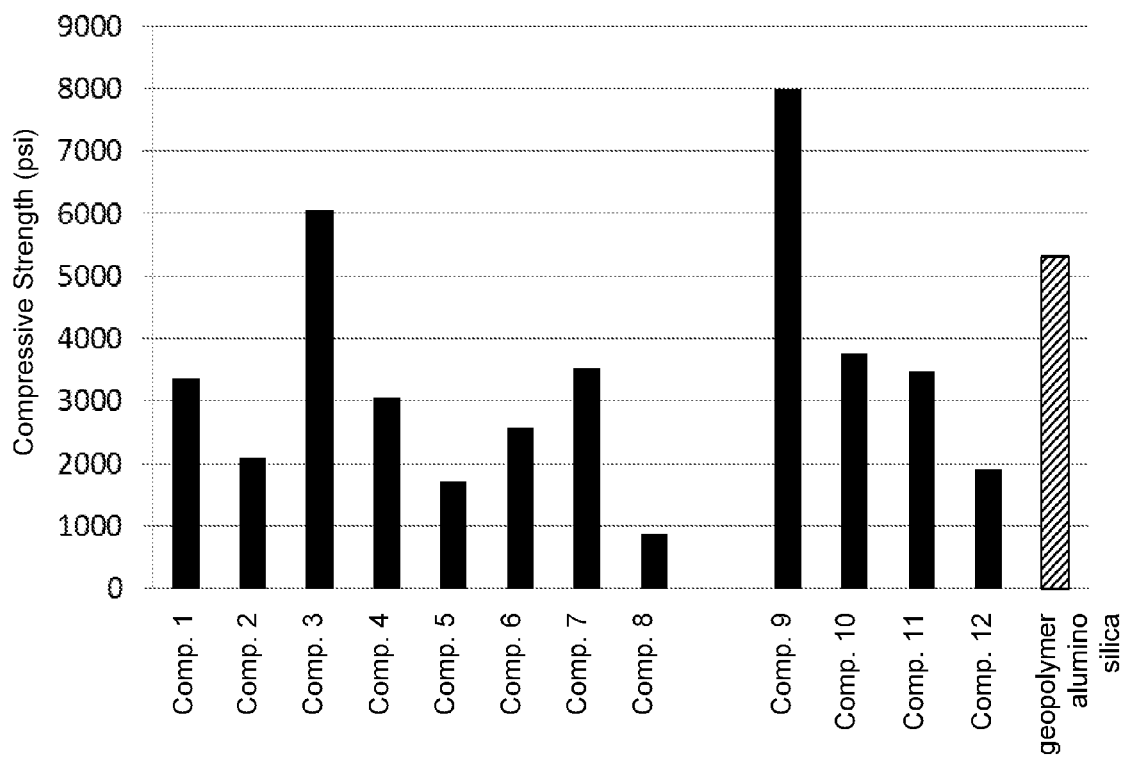
FIG. 2 is a chart of compressive strength for various proppant compositions in accordance with the methods described herein and as compared to a geopolymer alumino silica.

Table I presents the compositions 1-11 which are MKP, but differ by which filler is used. "Comp." is an abbreviation for "composition", not comparative. FIG. 2 is a chart of compressive strength for various proppant compositions in accordance with the methods described herein and as compared to the geopolymer alumino silica mentioned previously.

TABLE I

MKP Compositions

| Comp. | Filler | Compressive Strength (psi) | Density (g/cm³) |
|---|---|---|---|
| 1 | Fly Ash Class C | 3366 | 2 |
| 2 | Fly Ash Class F | 2097 | 2 |
| 3 | Wollastonite | 6049 | 2.2 |
| 4 | Pumice | 3053 | 1.92 |
| 5 | Fly Ash Class C | 1706 | 1.94 |
| 6 | Fly Ash Class F | 2575 | 1.77 |
| 7 | Wollastonite | 3535 | 1.91 |
| 8 | Pumice | 877 | 1.55 |
| 9 | Fly Ash Class C | 7986 | |
| 10 | Fly Ash Class F | 3768 | |
| 11 | Wollastonite | 3469 | |
| 12 geopolymer alumino silica | Pumice | 1910 5317.75 | |

Further, presented in Table II is a comparison of the weight percent fines generated (based on total proppant present) when a specific stress is applied for a sample of approximately 40 g for control 30/50 sand without a MKP coating and fines generated for 30/50 sand with a MKP coating demonstrating that much less fines are generated with the coated sand.

TABLE II

Fines Comparison of Uncoated and Coated 30/50 Sand

| Stress, psi (MPa) | Control Sand 30/50 Wt % fines generated at applied stress | Coated 30/50 Sand Wt % fines generated at applied stress |
|---|---|---|
| 6,000 (41.4) | 14.8 | 10.3 |
| 7,000 (48.2) | 20.6 | 12.5 |
| 8,000 (55.2) | 25.7 | 14.7 |

It will be appreciated that the descriptions above with respect to particular embodiments above are not intended to limit the invention in any way, but which are simply to further highlight or illustrate the invention.

It is to be understood that the invention is not limited to the exact details of procedures, operation, exact materials, or embodiments shown and described, as modifications and equivalents will be apparent to one skilled in the art. Accordingly, the invention is therefore to be limited only by the spirit and scope of the appended claims. Further, the specification is to be regarded in an illustrative rather than a restrictive sense. For example, specific combinations of proppant cores, coatings, reactants to form the coatings and/or cores, reaction conditions to form coatings on the proppants, hydraulic fracturing method steps, and the like, falling within the claimed parameters, but not specifically identified or tried in a particular method, are anticipated to be within the scope of this invention.

The present invention may in one non-limiting embodiment comprise, alternatively consist or in a different non-restrictive version consist essentially of the elements disclosed. For instance, there may be provided a method of preparing a strengthened proppant that consists essentially of or consists of mixing together (a) a compound selected from the group consisting of an alkali metal phosphate, phosphoric acid, ammonium phosphate, ammonium di-hydrogen phosphate, and combinations thereof, and (b) a binder selected from the group consisting of an alkaline earth metal hydroxide, an alkaline earth metal oxide, a metal oxide, a metal hydroxide, an alumino silicate, and combinations thereof in water to form an aqueous solution; at least partially coating a plurality of proppant cores with the aqueous solution; and exposing the aqueous solution-coated proppant cores to a temperature to polymerize the (a) compound selected from the group consisting of an alkali metal phosphate, a phosphoric acid, ammonium phosphate, and combinations thereof and (b) binder selected from the group consisting of a metal oxide, a metal hydroxide, an alkaline earth metal hydroxide, an alkaline earth metal oxide, an aluminosilicate, and combinations thereof to form a coating where the coating is selected from the group consisting of magnesium phosphate, calcium phosphate, aluminum phosphate, zirconium aluminum phosphate, zirconium phosphate, zirconium phosphonate, magnesium potassium phosphate, potassium aluminum phosphate, alkali metal transition metal phosphates, carbide materials, tungsten carbide, cements, polymer cements, polyamide-imides, polyether ether ketones (PEEK), and combinations thereof, to give the strengthened proppant.

In another non-restrictive version there may be provided coated proppants consisting essentially of or consisting of a plurality of proppant cores selected from the group consisting of white sand, brown sand, ceramic beads, glass beads, bauxite grains, sintered bauxite, sized calcium carbonate, walnut shell fragments, aluminum pellets, silica, nylon pellets, nuts shells, gravel, resinous particles, alumina, minerals, polymeric particles, and combinations thereof, and a coating at least partially covering the proppant cores, where the coating is selected from the group consisting of magnesium phosphate, calcium phosphate, aluminum phosphate, zirconium aluminum phosphate, zirconium phosphate, zirconium phosphonate, magnesium potassium phosphate, potassium aluminum phosphate, alkali metal phosphates, carbide materials such as tungsten carbide, cements, polymer cements, high performance polymer coatings such as polyamide-imide and polyether ether ketones (PEEK), and combinations thereof.

Further there may be provided a method of preparing a strengthened proppant consisting essentially of or consisting of mixing together an alkali phosphate and a metal oxide or phosphoric acid and a metal oxide in the presence of water. The metal oxide is sparsely soluble in water and will react with the alkali phosphate or phosphoric acid to form an aqueous/gelatinous solution, coating a plurality of proppant cores with the aqueous solution, and polymerizing the metal phosphate either at room temperature or by exposing the solution coated cores to heat in an oven or another heat source, such as a heat gun.

There may also be provided coated proppants prepared by a method consisting essentially of or consisting of mixing together a phosphoric acid or an alkali phosphate, a filler consisting essentially of an alumino silicate such as fly ash or wollastonite, and a metal oxide in the presence of water to form an aqueous gelatinous solution, and heating the aqueous solution-coated proppant cores to polymerize the compound and the binder.

Additionally there may be provided a method for controlling fines production from a subterranean formation, which method consisting essentially of or consisting of placing at least one wellbore in the formation, hydraulically fracturing the formation via the wellbore via a fracturing fluid which creates at least one fracture, placing coated proppants into the fracture. The coated proppants comprise, consist essentially of or consist of a plurality of proppant cores as described in the previous paragraphs and a coating at least partially covering the proppant cores as described in the previous paragraphs.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method of preparing a strengthened proppant comprising:
   mixing together (a) a compound selected from the group consisting of an alkali metal phosphate, phosphoric acid, ammonium phosphate, ammonium dihydrogen phosphate, and combinations thereof, and (b) a binder selected from the group consisting of an alkaline earth metal hydroxide, an alkaline earth metal oxide, a metal oxide, a metal hydroxide, an alumino silicate, and combinations thereof in water to form an aqueous solution;
   at least partially coating a plurality of proppant cores with the aqueous solution; and
   exposing the aqueous solution-coated proppant cores to a temperature to polymerize the (a) compound selected from the group consisting of an alkali metal phosphate, a phosphoric acid, ammonium phosphate, ammonium dihydrogen phosphate, and combinations thereof and (b) binder selected from the group consisting of a metal oxide, a metal hydroxide, an alkaline earth metal hydroxide, an alkaline earth metal oxide, an aluminosilicate, and combinations thereof to form a coating where the coating is selected from the group consisting of magnesium phosphate, calcium phosphate, aluminum phosphate, zirconium aluminum phosphate, zirconium phosphate, zirconium phosphonate, magnesium potassium phosphate, potassium aluminum phosphate, alkali metal transition metal phosphates, carbide materials, tungsten carbide, cements, polymer cements, polyamide-imides, polyether ether ketones (PEEK), and combinations thereof, to give the strengthened proppant having a compressive strength ranging from about 34 to about 130 MPa.

2. The method of claim 1 where (a) the compound is alkali metal phosphate or phosphoric acid, or ammonium phosphate or ammonium dihydrogen phosphate and where the aqueous solution has a mole ratio of (a) compound/(b) binder ranging from about 0.1:1 to about 30:1.

3. The method of claim 1 where the (b) binder is selected from the group consisting of a metal oxide, a metal hydroxide, and combinations thereof, and the (a) compound is selected from the group consisting of alkali metal phosphate or phosphoric acid and mixtures thereof, and where the mole ratio of (b) binder to (a) compound in the aqueous solution ranges from about 0.1:1 to about 6:1.

4. The method of claim 1 where the aqueous solution further comprises fillers selected from the group consisting of silica sand, fly ash, sludges, slags, waste paper, rice husks, saw dust, volcanic aggregates, expanded perlite, pumice, scoria, obsidian, minerals, diatomaceous earth, mica, borosilicates, clays, metal oxides, metal fluorides, plant and animal remains, sea shells, coral, hemp fibers, manufactured fillers, silica, mineral fibers, mineral mats, chopped fiberglass, woven fiberglass, metal wools, turnings, shavings, wollastonite, nanoclays, carbon nanotubes, carbon fibers and nanofibers, graphene oxide, graphite, and combinations thereof.

5. The method of claim 1 where the proppant cores are heated prior to the coating with the aqueous solution.

6. The method of claim 5 where the proppant cores are heated to between about 0 and about 300° C.

7. The method of claim 1 where the proppant cores are selected from the group consisting of sand, ceramic beads, glass beads, bauxite grains, sintered bauxite, sized calcium carbonate, walnut shell fragments, aluminum pellets, silica, nylon pellets, nuts shells, gravel, resinous particles, alumina, minerals, polymeric particles, and combinations thereof.

8. The method of claim 1 where
   the (a) compound is an alkali metal phosphate, and the (b) binder is selected from the group consisting of an alkaline earth metal hydroxide, an alkaline earth metal oxide, and combinations thereof, the alkali metal is selected from the group consisting of sodium, potassium and mixtures thereof and the alkaline earth metal is selected from the group consisting of calcium, magnesium and mixtures thereof, and
   the coating is selected from the group consisting of magnesium phosphate, aluminum phosphate, zirconium aluminum phosphate, zirconium phosphate, zirconium phosphonate, magnesium potassium phosphate, and combinations thereof.

9. The method of claim 1 where the strengthened proppant has
   a density ranging from about 2 to about 2.63 g/cm$^3$.

10. A method of preparing a strengthened proppant comprising:
    mixing together (a) a compound selected from the group consisting of an alkali metal phosphate, phosphoric acid, ammonium phosphate, ammonium di-hydrogen phosphate, and combinations thereof, and (b) a binder selected from the group consisting of an alkaline earth metal hydroxide, an alkaline earth metal oxide, a metal oxide, a metal hydroxide, an aluminosilicate, and combinations thereof, in water to form an aqueous solution, and where the aqueous solution has a mole ratio of (a) compound/(b) binder ranging from about 0.1:1 to about 30:1;
    at least partially coating a plurality of proppant cores with the aqueous solution, where the proppant cores are selected from the group consisting of sand, ceramic beads, glass beads, bauxite grains, sintered bauxite, sized calcium carbonate, walnut shell fragments, aluminum pellets, silica, nylon pellets, nuts shells, gravel, resinous particles, alumina, minerals, polymeric particles, and combinations thereof; and
    exposing the aqueous solution-coated proppant cores to a temperature to polymerize the (a) compound selected from the group consisting of an alkali metal phosphate, a phosphoric acid, ammonium phosphate, ammonium dihydrogen phosphate, and combinations thereof and (b) binder selected from the group consisting of an alkaline earth metal hydroxide, an alkaline earth metal oxide, a metal oxide, a metal hydroxide, an aluminosilicate in water, and combinations thereof to form a coating where the coating is selected from the group consisting of magnesium phosphate, calcium phosphate, aluminum phosphate, zirconium aluminum phosphate, zirconium phosphate, zirconium phosphonate, magnesium potassium phosphate, potassium aluminum phosphate, alkali metal transition metal phosphates, carbide materials, tungsten carbide, cements, polymer cements, polyamide-imides, polyether ether ketones (PEEK), and combinations thereof, to give the strengthened proppant having a compressive strength ranging from about 34 to about 130 MPa.

11. The method of claim 10 where the aqueous solution further comprises fillers selected from the group consisting of silica sand, fly ash, sludges, slags, waste paper, rice husks, saw dust, volcanic aggregates, expanded perlite, pumice, scoria, obsidian, minerals, diatomaceous earth, mica, borosilicates, clays, metal oxides, metal fluorides, plant and animal remains, sea shells, coral, hemp fibers, manufactured fillers, silica, mineral fibers, mineral mats, chopped fiberglass, woven fiberglass, metal wools, turnings, shavings, wollastonite, nanoclays, carbon nanotubes, carbon fibers and nanofibers, graphene oxide, graphite, and combinations thereof.

12. The method of claim 10 where the proppant cores are heated prior to the coating with the aqueous solution.

13. The method of claim 12 where the proppant cores are heated to between about 0 and about 300° C.

14. The method of claim 10 where
in the (a) compound is selected from the group consisting of an alkali metal phosphate, phosphoric acid, ammonium phosphate, ammonium dihydrogen phosphate, and combinations thereof, and the (b) binder is an alkaline earth metal hydroxide, an alkaline earth metal oxide, and combinations thereof, the alkali metal is selected from the group consisting of sodium, potassium and mixtures thereof and the alkaline earth metal is selected from the group consisting of calcium, magnesium and mixtures thereof, and
the coating is selected from the group consisting of magnesium phosphate, aluminum phosphate, zirconium aluminum phosphate, zirconium phosphate, zirconium phosphonate, magnesium potassium phosphate, and combinations thereof.

15. The method of claim 10 where the strengthened proppant has
a density ranging from about 2 to about 2.63 g/cm$^3$.

16. A method of preparing a strengthened proppant comprising:
mixing together (a) a compound selected from the group consisting of an alkali metal phosphate, phosphoric acid, ammonium phosphate, ammonium dihydrogen phosphate, and combinations thereof, the alkali metal is selected from the group consisting of sodium, potassium and mixtures thereof and (b) a binder selected from the group consisting of an alkaline earth metal hydroxide, an alkaline earth metal oxide, metal oxide, a metal hydroxide, and combinations thereof in water to form an aqueous solution where the ratio of (b) binder to (a) compound in the aqueous solution ranges from about 0.1:1 to about 6:1;
at least partially coating a plurality of proppant cores with the aqueous solution, where the proppant cores are selected from the group consisting of sand, ceramic beads, glass beads, bauxite grains, sintered bauxite, sized calcium carbonate, walnut shell fragments, aluminum pellets, silica, nylon pellets, nuts shells, gravel, resinous particles, alumina, minerals, polymeric particles, and combinations thereof; and
exposing the aqueous solution-coated proppant cores to temperature to polymerize the (a) compound selected from the group consisting of an alkali metal phosphate, phosphoric acid, ammonium phosphate, ammonium di-hydrogen phosphate, and combinations thereof and (b) binder selected from the group consisting of alkaline earth metal hydroxide, an alkaline earth metal oxide, a metal oxide, a metal hydroxide, and water, and combination thereof to form a coating where the coating is selected from the group consisting of magnesium phosphate, calcium phosphate, aluminum phosphate, zirconium aluminum phosphate, zirconium phosphate, zirconium phosphonate, magnesium potassium phosphate, potassium aluminum phosphate, and combinations thereof, to give the strengthened proppant having a compressive strength ranging from about 34 to about 130 MPa.

17. The method of claim 16 where the aqueous solution further comprises fillers selected from the group consisting of silica sand, fly ash, sludges, slags, waste paper, rice husks, saw dust, volcanic aggregates, expanded perlite, pumice, scoria, obsidian, minerals, diatomaceous earth, mica, borosilicates, clays, metal oxides, metal fluorides, plant and animal remains, sea shells, coral, hemp fibers, manufactured fillers, silica, mineral fibers, mineral mats, chopped fiberglass, woven fiberglass, metal wools, turnings, shavings, wollastonite, nanoclays, carbon nanotubes, carbon fibers and nanofibers, graphene oxide, graphite, and combinations thereof.

18. The method of claim 16 where the temperature of the proppant cores is between about 0 and about 300° C. prior to the coating with the aqueous solution.

19. The method of claim 16 where the strengthened proppant has
a density ranging from about 2 to about 2.63 g/cm$^3$.

* * * * *